United States Patent
Testerman

(10) Patent No.: US 10,606,985 B2
(45) Date of Patent: Mar. 31, 2020

(54) SECURE FILE WRAPPER FOR TIFF IMAGES

(71) Applicant: Dell Products L.P., Round Rock, TX (US)

(72) Inventor: James D. Testerman, McKinney, TX (US)

(73) Assignee: Dell Products L.P., Round Rock, TX (US)

(*) Notice: Subject to any disclaimer, the term of this patent is extended or adjusted under 35 U.S.C. 154(b) by 201 days.

(21) Appl. No.: 15/499,191

(22) Filed: Apr. 27, 2017

(65) Prior Publication Data
US 2018/0314836 A1    Nov. 1, 2018

(51) Int. Cl.
*G06F 21/62*    (2013.01)
*G06F 21/60*    (2013.01)
*G06F 21/10*    (2013.01)

(52) U.S. Cl.
CPC .............. *G06F 21/10* (2013.01); *G06F 21/60* (2013.01); *G06F 21/6227* (2013.01); *G06F 21/6218* (2013.01); *G06F 2221/2107* (2013.01)

(58) Field of Classification Search
CPC .......... G06F 21/60; G06F 21/62–6227; G06F 2221/2107
See application file for complete search history.

(56) References Cited

U.S. PATENT DOCUMENTS

| | | | |
|---|---|---|---|
| 9,110,963 B2 | 8/2015 | Burchett et al. | |
| 9,201,877 B1* | 12/2015 | Humby | G06F 17/30 |
| 2005/0071744 A1* | 3/2005 | Dunbar | G11B 20/12 |
| | | | 715/200 |
| 2008/0218805 A1* | 9/2008 | Dokuni | H04N 1/00209 |
| | | | 358/3.28 |
| 2011/0185190 A1* | 7/2011 | Berengoltz | G06F 21/6218 |
| | | | 713/189 |
| 2013/0151761 A1* | 6/2013 | Kim | G06F 21/78 |
| | | | 711/103 |
| 2014/0122544 A1* | 5/2014 | Tran | G06F 21/6209 |
| | | | 707/825 |
| 2014/0359283 A1* | 12/2014 | Lee | H04L 67/2852 |
| | | | 713/165 |
| 2016/0063224 A1* | 3/2016 | Raley | G06F 21/105 |
| | | | 726/29 |
| 2016/0294781 A1* | 10/2016 | Ninan | H04L 63/0407 |
| 2018/0307847 A1* | 10/2018 | Lee | H04L 9/06 |

* cited by examiner

*Primary Examiner* — Daniel B Potratz
(74) *Attorney, Agent, or Firm* — Norton Rose Fulbright US LLP

(57) ABSTRACT

Encrypted content may be stored in a file wrapper with unencrypted content that provides information regarding the encrypted content. The file wrapper may be stored around the encrypted content or may be stored in front or behind the encrypted content. The unencrypted content may indicate, for example, that additional content in the file is encrypted. A TIFF-formatted file may be used to store the two portions of content. A TIFF file structure may have content stored in a plurality of images. The unencrypted content may be stored in a first image of a TIFF file. The encrypted content may be stored in a second image, third image, and/or additional images of the TIFF file.

20 Claims, 3 Drawing Sheets

SECURE FILE WRAPPER FOR TIFF IMAGES

FIELD OF THE DISCLOSURE

The instant disclosure relates to file encryption. More specifically, portions of this disclosure relate to processing files containing encrypted and unencrypted content.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many users of information handling systems use applications to create, manage, and/or save files containing information. Encryption of the files secures the data against access by unintended recipients. However, encrypted files become unintelligible to unintended recipients or to incompatible applications used by the intended recipient.

SUMMARY

One difficulty with encrypted files is that the entire file is encrypted such that an untrusted computer or even an untrusted application on a computer cannot read any content from the encrypted file. A user accessing the encrypted document may see only garbled characters when accessing the encrypted file if the user does not open the document with appropriate software. The garbled characters appear to be a corrupt file that has been damaged during transmission over a network or during storage on a faulty storage medium. The user may thus mistake the encrypted file for a corrupt file and delete the encrypted file without knowing that there is accessible content in the encrypted file.

Encrypted content may be stored in a file wrapper with unencrypted content that provides information regarding the encrypted content. The file wrapper may be stored around the encrypted content or may be stored in front or behind the encrypted content. The unencrypted content may indicate, for example, that additional content in the file is encrypted. Thus, a user that accesses the file with any application will be able to identify the file as not corrupt, by reading the unencrypted content, and execute the appropriate software to access the encrypted content. Some information handling systems may perform the detection of encrypted content and execution of the appropriate software without intervention from the user in response to a user's request to open the file. The appropriate process for accessing the encrypted content may be indicated in the non-encrypted content of the file. The unencrypted content may form a file wrapper around the encrypted content. The encrypted content may include any type of content such that the file wrapper is a universal file wrapper.

The universal file wrapper may be stored in a two-part file with the unencrypted content in a first portion and the encrypted content in a second portion. As one example, a TIFF-formatted file may be used to store the two portions of content. A TIFF file structure may have content stored in a plurality of images. The unencrypted content may be stored in a first image of a TIFF file. The encrypted content may be stored in a second image, third image, and/or additional images of the TIFF file. The first image with the unencrypted content may be an immediate first image of the TIFF file such that an application generating a preview of the TIFF file may access the unencrypted content first before any encrypted content. By locating the unencrypted content in this first portion of the file or another preview portion of a file, whether a TIFF-formatted file or other-formatted file, applications may be able to quickly determine the file is not corrupt.

The unencrypted content of the file may include an indicator of encrypted content present in the file and information regarding the encrypted content, such as whether the encrypted content is an image, video, document, or other format. The unencrypted content may also include a descriptor for how to process the encrypted content. For example, the descriptor may indicate an appropriate application for accessing the encrypted content. As another example, the descriptor may indicate an appropriate access path for accessing the encrypted content. An example access path may identify a virtual file system capable of decrypting the encrypted content.

The encrypted content may be located in a second portion of the file that is accessed subsequent to the first portion when the file is accessed by the information handling system. Thus, the information handling system does not access the undecipherable information without first receiving an indication of the presence of encrypted content. In the example of a TIFF-formatted file, the encrypted content may be stored on a second image or later image in a TIFF file. The encrypted content may be stored in custom data chunks defined in the TIFF file. The custom data chunk may be labeled in a TIFF file with a private tag to indicate the proprietary information in the images. An application reading a TIFF file may that does not support the encrypted content may recognize the private tag and ignore content in the custom data chunks.

The file wrapper with unencrypted content for the encrypted content can improve the user's experience in dealing with encrypted files. The unencrypted content can prevent applications from trying to read encrypted documents that could cause crashes or cause the viewer to believe the encrypted file is a corrupted file. The unencrypted content may be located in a first-accessed portion of the file such that an application reading only a preview portion of the file can determine the indication of encrypted content in the file. Improving a user's experience with encrypted files may improve the likelihood that the user implements encryption and other data security measures by removing confusion involved in operating with encrypted content. Without these improvements, a user's poor experience with encrypted content, such as caused by applications crashing or deleting of needed data, may cause the user to abandon data security and leave the user vulnerable to data theft.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
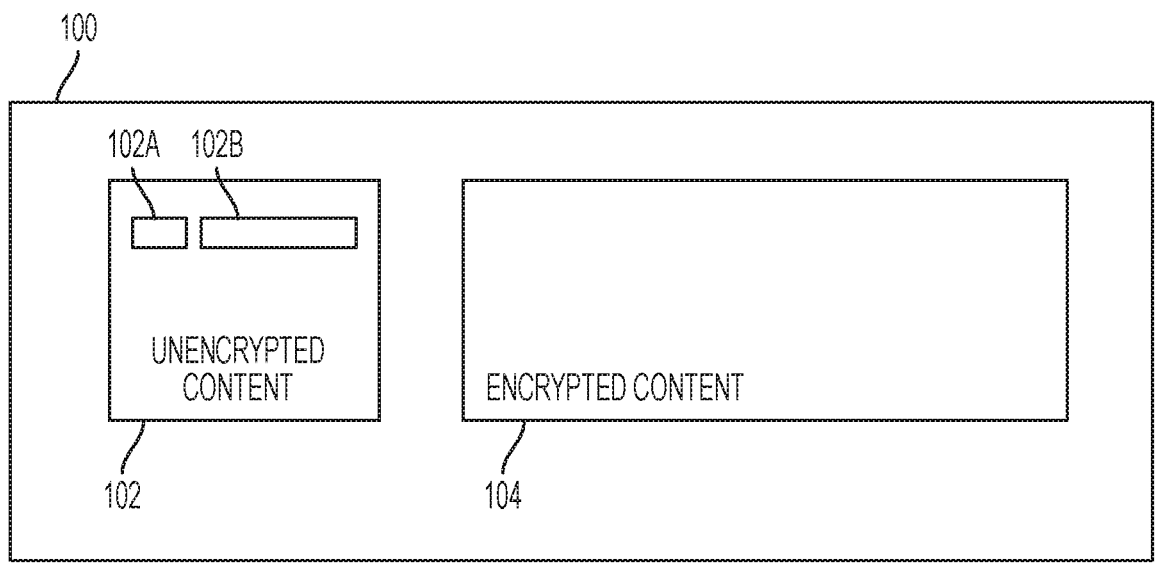
FIG. 1 is a block diagram illustrating an encrypted file with a file wrapper around encrypted content according to some embodiments of the disclosure.

FIG. 1 is a block diagram illustrating an encrypted file with a file wrapper around encrypted content according to some embodiments of the disclosure. A file 100 may include a first portion 102 and a second portion 104. The first portion 102 may include unencrypted content. The unencrypted content may include an indication 102A of encrypted content in the file. The unencrypted content may include a descriptor 102B of the encrypted content in the file, such as a type of content (e.g., video, image, document) contained in the encrypted content, an application for accessing the content, and/or a process for accessing the content. The unencrypted content may include metadata describing the file 100, such as a user that created the file 100, a date and time of creation of the file 100, a date and time of last modification of the file 100, access rights for different users or user groups to the file 100, other security-related data for the file 100, and/or other information.

The file 100 may also include the second portion 104. The second portion 104 may include encrypted content. The encrypted content may be encrypted according to any encryption algorithm, such as Triple Data Encryption Standard (DES), Rivest-Shamir-Adleman (RSA), Blowfish, Twofish, and Advanced Encryption Standard (AES) encryption algorithms. The file 100 may store the first portion 102 and the second portion 104 formatted in a proprietary file format or another file format supported by the information handling system. In some formats, the encrypted content may be stored with the unencrypted content in such a manner that an application or file system accessing the file 100 from a storage medium will access the first portion 102 before accessing the second portion 104.

Figure 2:
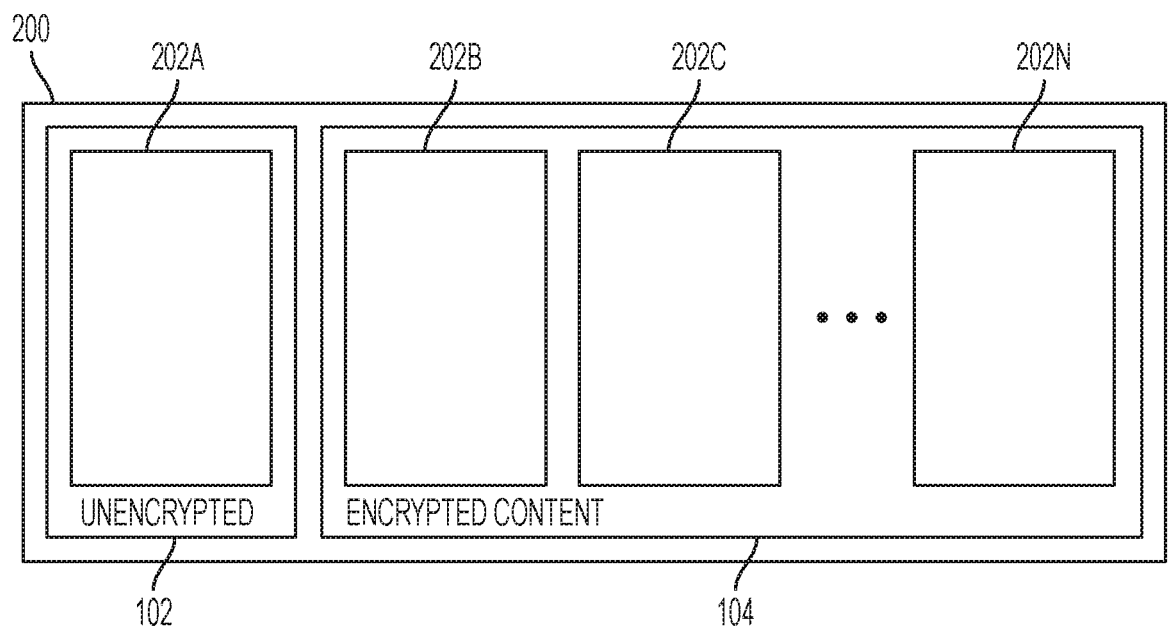
FIG. 2 is a block diagram illustrating a TIFF-formatted file with encrypted and unencrypted content stored in separate images according to some embodiments of the disclosure.

In one example, the file 100 may be formatted according to the TIFF standard. FIG. 2 is a block diagram illustrating a TIFF-formatted file with encrypted and unencrypted content stored in separate images according to some embodiments of the disclosure. A TIFF-formatted file 200 may include a plurality of images 202. The first portion 102 of unencrypted content may be stored in a first image 202A. The second portion 104 of encrypted content may be stored in a second image 202B or subsequent images 202C-N. When the encrypted content is image files, each image file may be stored as separate images in images 202B-N. The encrypted images in images 202B-N may require a key, a password, and/or a particular application to decode the encrypted content and obtain the images.

The images 202B-N may be recognized as encrypted content based on the unencrypted content in the first image 202A. Appropriate steps may be taken by an information handling system to process the encrypted content. In one example, the images 202B-N may be accessed through a virtual file system with a transformer that decodes the encrypted content to obtain images that can be displayed by commonly-available image viewer applications. The virtual file system provides one example of a background process for decrypting the encrypted content for display by applications without special applications and without special instructions or additional interaction with a user. In another example, the images 202B-N may be decoded using a password. The application may prompt the user for a password when the application identifies an indicator in the first image 202A of encrypted content in subsequent pages. The application may use the password as input to a decryption algorithm to decrypt the encrypted content of images 202B-N and display the images to the user. The application may take precautions to prevent the user from exporting the decrypted images from the application to prevent proliferation of the images as unencrypted content separate from the file 100.

The inclusion of the unencrypted data improves the transferability of the file 100. The encrypted file will not mistakenly be determined to be a corrupted file because some unencrypted data is attached to the encrypted file to allow recognition of the encrypted content. Thus, the file 100 can be transmitted to other users without the file being mistakenly deleted, and the encrypted portions prevent unintended recipients from accessing the encrypted content.

Although a TIFF-formatted file is described as one example, other file formats may be used to store the first portion 102 and the second portion 104. For example, a PDF-formatted document may include the first portion 102 in a first page of the PDF file and the second portion 104 on a second page and/or subsequent pages of the PDF file. As another example, a XML-formatted document may include the first portion 102 within a first tagged section and the second portion 104 within a second tagged section and/or subsequent tagged sections.

The information handling system may process at least part of the file and recognize the presence of encrypted content. When the encrypted content is recognized, steps can be taken to appropriately process the encrypted content. In one example embodiment, the encrypted content may be processed by decrypting the encrypted content using a virtual file system. The virtual file system may process requests for encrypted content through a transformer, such as a decryption algorithm. The virtual file system may be activated by accessing a file through an appropriate access path. The access path for accessing a decrypting encrypted content in a file may be different than an access path for accessing the file. Both access paths may point to the same location on a data storage device, although one of the access paths may activate the virtual file system.

Figure 3:
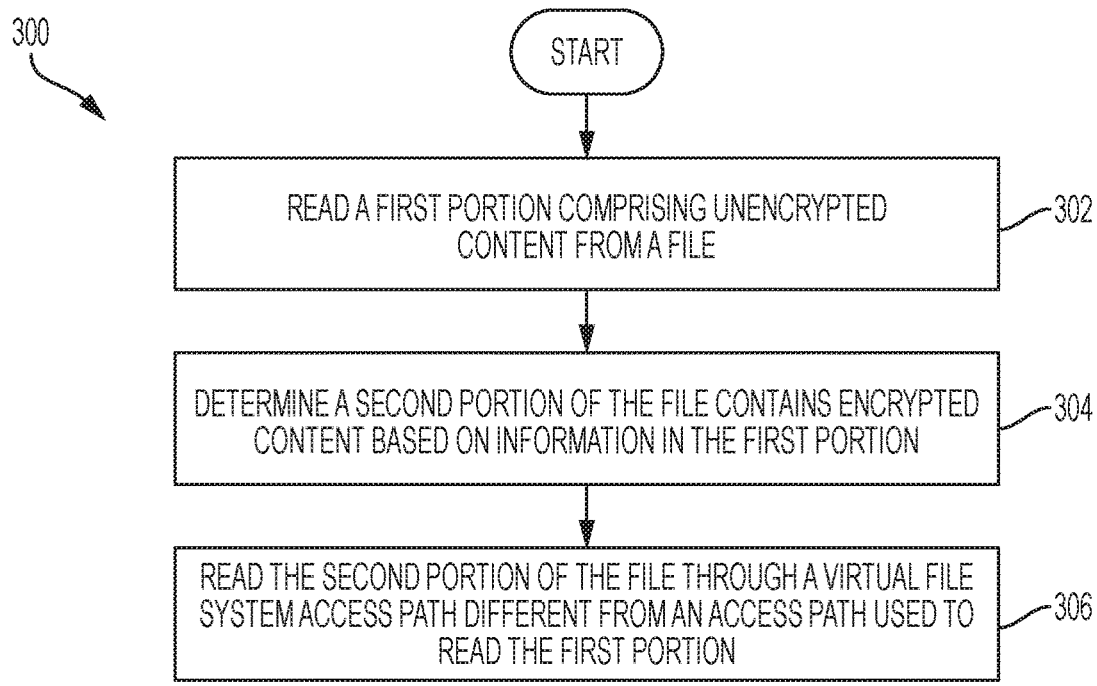
FIG. 3 is a flow chart illustrating an example method for processing a file with encrypted content on an information handling system according to some embodiments of the disclosure.

An example method for accessing the encrypted content through a virtual file system is described with reference to FIG. 3. FIG. 3 is a flow chart illustrating an example method for processing a file with encrypted content on an information handling system according to some embodiments of the disclosure. A method 300 may begin at block 302 with an information handling system reading a first portion of the file, wherein the first portion includes unencrypted content. The information handling system may then, at block 304, determine, based on the first portion of the file, that a second portion of the file includes encrypted content. The information handling system may then, at block 306, read the second portion of the file through a virtual file system access path different from an access path used to perform the step of reading the first portion of the file. The virtual file system may use decryption algorithms to decrypt the second portion of the file. The decryption algorithm applied by the virtual file system may be selected based on information in the first portion of unencrypted content in the file. The access path for accessing the encrypted content through the virtual file system may be based on information in the first portion of the file. Alternatively, the access path for the virtual file system may be a mapped directory in the virtual file system corresponding to the directory in the default file system. For example, an access path for a file may be "C:\Users\Admin\Documents\test.tif." Accessing the "test.tif" file may indicate that a second image in the file contains encrypted content. The system may then access "C:\VFS\Documents\test.tif" to read the encrypted content based on a priori knowledge that the "C:\Users\Admin" directory is mapped to "CAWS" in the virtual file system.

The encrypted content in the second portion of the file may contain content of a different format than that indicated by the first file wrapper for the second portion. For example, the file may be a TIFF-formatted file with encrypted content comprising a text file. When the file is accessed and the encrypted content identified, an appropriate application may be executed automatically, without user intervention, to view the encrypted content. The application may be executed with an input of the access path for the file through the virtual file system to allow decrypting and viewing of the encrypted content. For example, the access path may be provided as a command-line input to the application.

Figure 4:
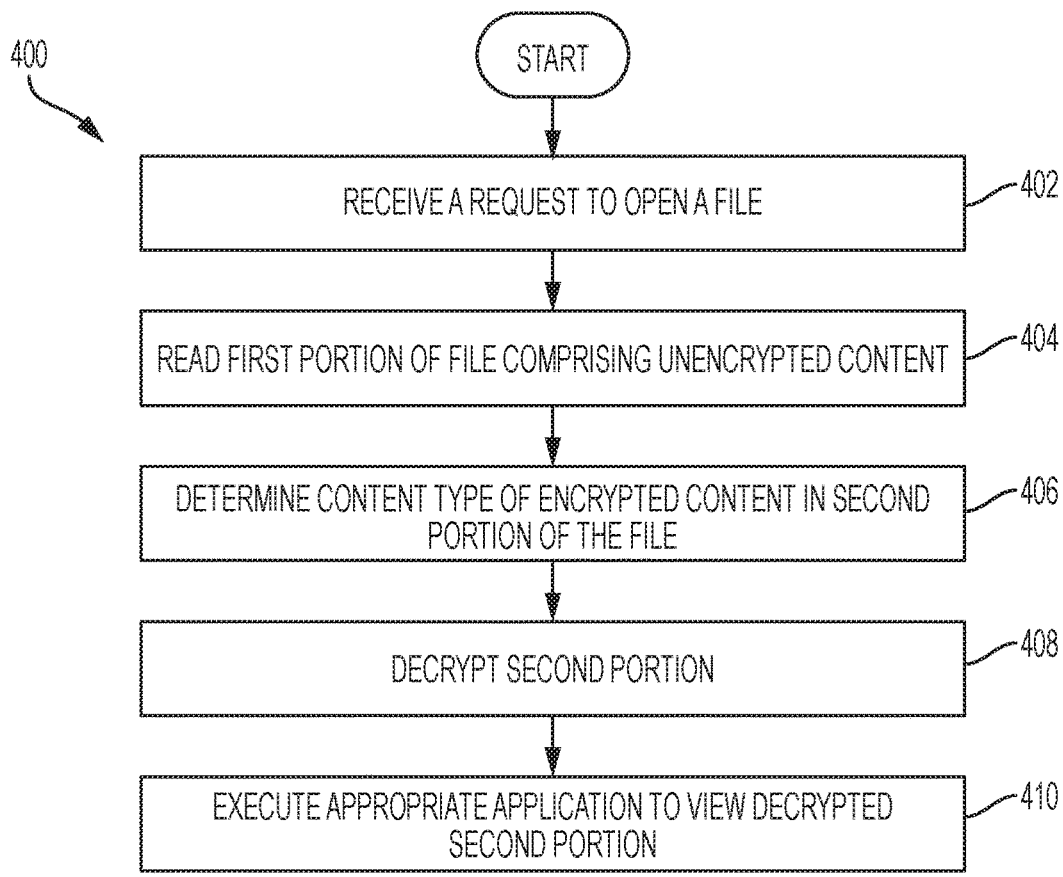
FIG. 4 is a flow chart illustrating an example method for automatically executing an application for viewing encrypted content stored in a file with a universal file wrapper according to some embodiments of the disclosure.

FIG. 4 is a flow chart illustrating an example method for automatically executing an application for viewing encrypted content stored in a file with a universal file wrapper according to some embodiments of the disclosure. A method 400 may begin at block 402 with an information handling system receiving a request from a user to open a file. The request may be, for example, a double-click on an icon representing the file on a display. At block 404, the information handling system may read a first portion of unencrypted content from the file. For example, for a TIFF-formatted file the information handling system may read a first image from the file to generate a preview. At block 406, the information handling system may determine a content type of encrypted content in a second portion of the file. For example, for a TIFF-formatted file the information handling system may determine from the first image that a second image contains an encrypted text document. At block 408, the information handling system may process the second portion of the file to decrypt the second portion. For example, the second portion of the file may be accessed through a virtual file system access path. At block 410, an appropriate application may be executed to view the second portion of the file decrypted at block 408.

The encrypted content with a file wrapper as described herein provides for easier handling and transfer of the encrypted content. At least a portion of the file wrapper contains unencrypted content that allows an information handling system to at least understand that the file is not corrupt. This can prevent inadvertent destruction of the file. Recipients authorized to access the encrypted content in the file can access the content by using information in the file wrapper. For example, a first image of unencrypted content in a TIFF file may indicate that the encrypted content in a second image of the TIFF file is an encrypted text document. The second image of the TIFF file may be encrypted content stored with a private tag label. The private tag label may also be unencrypted content, such as a unique identifier number, that is part of the file wrapper. The file wrapper may include other content, either encrypted or unencrypted, that encapsulates, precedes, or follows the encrypted content.

Figure 5:
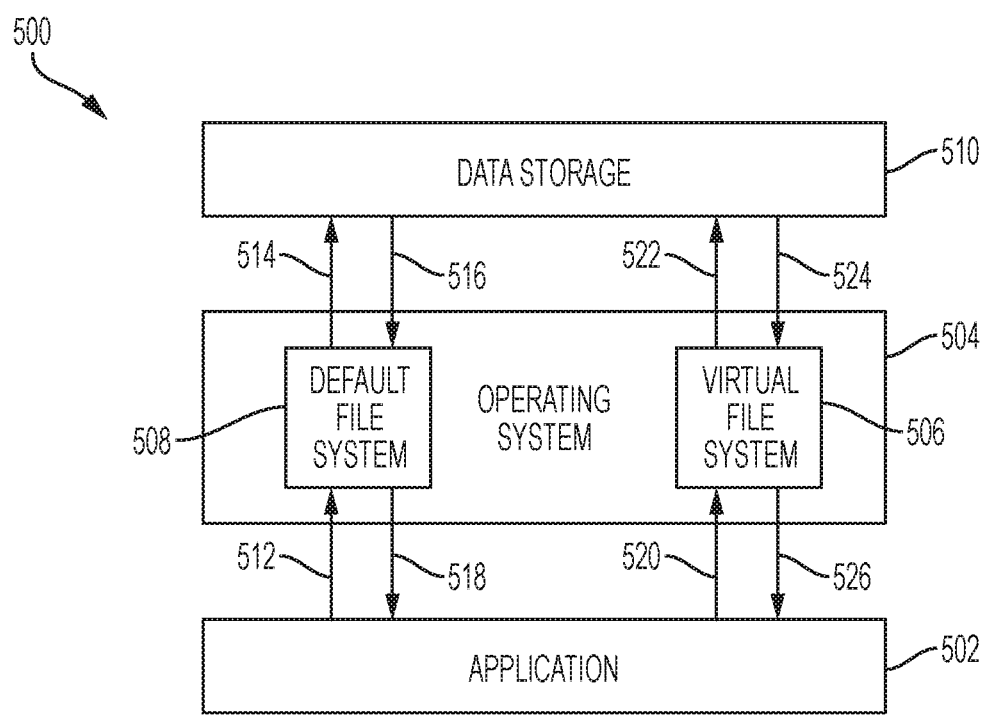
FIG. 5 is a block diagram illustrating an information handling system with a virtual file system for handling encrypted files according to some embodiments of the disclosure.

One configuration for an information handling system for reading the encrypted content through a virtual file system is described with reference to FIG. 5. FIG. 5 is a block diagram illustrating an information handling system 500 with a virtual file system 506 for handling encrypted files according to some embodiments of the disclosure. The virtual file system 506 may contain encryption and decryption algorithms to encrypt files either automatically or when a user requests encryption and decrypt files when a user accesses them. The encryption and decryption algorithms may function to encrypt and decrypt portions of files or files in their entirety. An application 502, such as a word processor, a spreadsheet application, a presentation application, an image editing application, or other application that may create and/or access files on an information handling system, may request access 512 to a file from a default file system 508 of the operating system 504. The default file system 508 may be a standard file system built into the operating system 504 that a user may interact with directly. The default file system may request 514 the file from a data storage 510, retrieve 516 the file from the data storage 510, and return 518 the file to the application 502. The data storage 510 may be a solid state drive, a hard drive, or other data storage device and may be local or may be remotely-accessed cloud storage.

An alternative access path to data in data storage 510 is through the virtual file system 506. When accessing an encrypted file, through the virtual file system 506, the application 502 may request 520 a file from the virtual file system 506. An encrypted file may be a file that is at least partially encrypted. The virtual file system 506 may encrypt and decrypt files passing through it, to prevent access by unintended users. The virtual file system 506 may then request 522 the file from the data storage 510 and the data storage may return 524 the file to the virtual file system. The virtual file system 506 may decrypt the file and return 526 the decrypted file to the application 502. Separate access paths 512-518 and 520-526 for accessing the same encrypted file in the data storage 510 through the default file system 508 and the virtual file system 506, respectively, may exist. A file access path may include a combination of virtual and/or physical busses through which data stored at a particular location in data storage may be accessed. A particular access path for accessing particular data may be activated by a corresponding address mapped to the particular access path. If an encrypted file is accessed through the default file system 508 the application 502 may be unable to read some or all of the contents of the file as the contents will not be decrypted, while if the encrypted file is accessed through the virtual file system 506 the file may be decrypted by the virtual file system 506 and readable in its entirety by the application 502. Similarly, the virtual file system 506 may encrypt files being passed through the virtual file system before they are stored in data storage 510.

A virtual file system may also be referred to as a call-back file system, such as the system described in U.S. Pat. No. 9,110,963 to Burchett et al. and entitled "TRANSPARENT ADAPTIVE FILE TRANSFORM," which is hereby incorporated by reference. A call-back file system can provide an extensible action pipeline that is applied to files dynamically as they are accessed from and saved to a data storage. For example, a call-back file system can be configured to allow an action or a combination of actions to be performed on a file in response to access of the file by an application. A data transform may be performed on a file in response to access of the file by an application and may include data compression and/or encryption. Data transforms may also include file-type transformation, rights management embedding, file name obfuscation, bulk upload, or a change of communications protocols. The call back file system may also be configured to create a backup or a shadow copy of data accessed at a second location. The call-back file system may perform content filtering (e.g., removal of credit card or other personal or private data). The call-back file system may add or remove metadata. The call-back file system may be configured to add an entry to an audit log showing file activity. Various actions of the call-back file system may be set on an application-by-application basis, in response to the type of data access activity, in response to the content of the data being accessed, or the like. The call-back file system may be configured to perform file transform and recordkeeping operations in the background with little input by a user.

The schematic flow chart diagrams of FIG. 3 and FIG. 4 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. A method for processing a file on an information handling system, comprising:
   reading a first portion of the file, wherein the first portion is unencrypted;
   determining, based on the first portion of the file, that a second portion of the file is encrypted; and
   reading the second portion of the file through a virtual file system access path different from an access path used to perform the step of reading the first portion of the file, wherein the virtual file system decrypts the second portion of the file,
   wherein the access path comprises a first address for accessing the first portion of the file at a location in a data storage through a default file system and the virtual file system access path comprises a second address for accessing the second portion of the file at the location in the data storage through the virtual file system.

2. The method of claim 1, wherein information in the first portion of the file comprises an image, and wherein the second portion of the file comprises a document.

3. The method of claim 1, further comprising executing an application to display the second portion of the file, wherein the application used to display the second portion of the file is selected based, at least in part, on information in the first portion of the file.

4. The method of claim 3, wherein the application comprises a document editor, and wherein the information in the first portion of the file indicates that the second portion of the file comprises a document file.

5. The method of claim 1, wherein the file comprises a TIFF-formatted file comprising a plurality of images, and wherein the first portion of the file comprises an immediate first image of the plurality of images of the TIFF formatted file.

6. The method of claim 5, further comprising generating a preview of the TIFF-formatted file based on the first image.

7. The method of claim 5, wherein the second portion of the file comprises a second image of the plurality of images, and wherein the second image comprises a custom block type defined in the TIFF formatted file.

8. An information handling system, comprising:
   a memory; and
   a processor coupled to the memory, wherein the processor is configured to perform steps comprising:
   reading a first portion of the file, wherein the first portion is unencrypted;
   determining, based on the first portion of the file, that a second portion of the file is encrypted; and
   reading the second portion of the file through a virtual file system access path different from an access path used to perform the step of reading the first portion of the file, wherein the virtual file system decrypts the second portion of the file,
   wherein the access path comprises a first address for accessing the first portion of the file at a location in a data storage through a default file system and the virtual file system access path comprises a second address for accessing the second portion of the file at the location in the data storage through the virtual file system.

9. The information handling system of claim 8, wherein information in the first portion of the file comprises an image, and wherein the second portion of the file comprises a document.

10. The information handling system of claim 8, wherein the processor is further configured to perform steps comprising executing an application to display the second portion of the file, wherein the application used to display the second portion of the file is selected based, at least in part, on information in the first portion of the file.

11. The information handling system of claim 10, wherein the application comprises a document editor, and wherein the information in the first portion of the file indicates that the second portion of the file comprises a document file.

12. The information handling system of claim 8, wherein the file comprises a TIFF-formatted file comprising a plurality of images, and wherein the first portion of the file comprises an immediate first image of the plurality of images of the TIFF formatted file.

13. The information handling system of claim 12, wherein the processor is further configured to perform steps comprising generating a preview of the TIFF-formatted file based on the first image.

14. The information handling system of claim 12, wherein the second portion of the file comprises a second image of the plurality of images, and wherein the second image comprises a custom block type defined in the TIFF formatted file.

15. A computer program product, comprising:
   a non-transitory computer readable medium comprising code to perform steps comprising:

reading a first portion of the file, wherein the first portion is unencrypted;

determining, based on the first portion of the file, that a second portion of the file is encrypted; and reading the second portion of the file through a virtual file system access path different from an access path used to perform the step of reading the first portion of the file, wherein the virtual file system decrypts the second portion of the file, wherein the access path comprises a first address for accessing the first portion of the file at a location in a data storage through a default file system and the virtual file system access path comprises a second address for accessing the second portion of the file at the location in the data storage through the virtual file system.

16. The computer program product of claim 15, wherein information in the first portion of the file comprises an image, and wherein the second portion of the file comprises a document.

17. The computer program product of claim 15, wherein the medium further comprises code to perform steps comprising executing an application to display the second portion of the file, wherein the application used to display the second portion of the file is selected based, at least in part, on information in the first portion of the file.

18. The computer program product of claim 15, wherein the file comprises a TIFF-formatted file comprising a plurality of images, and wherein the first portion of the file comprises an immediate first image of the plurality of images of the TIFF formatted file.

19. The computer program product of claim 18, wherein the medium further comprises code to perform steps comprising generating a preview of the TIFF-formatted file based on the first image.

20. The computer program product of claim 18, wherein the second portion of the file comprises a second image of the plurality of images, and wherein the second image comprises a custom block type defined in the TIFF formatted file.

* * * * *